United States Patent
Drew et al.

(10) Patent No.: US 9,633,357 B2
(45) Date of Patent: Apr. 25, 2017

(54) NET UTILITY DETERMINATION BASED ON PRODUCT REPLACEMENT AND SERVICE PLAN COVERAGE DECISIONS

(75) Inventors: Julie Ward Drew, Redwood City, CA (US); Ruxian Wang, New York, NY (US)

(73) Assignee: Hewlett Packard Enterprise Development LP, Houston, TX (US)

(*) Notice: Subject to any disclaimer, the term of this patent is extended or adjusted under 35 U.S.C. 154(b) by 1788 days.

(21) Appl. No.: 12/893,795

(22) Filed: Sep. 29, 2010

(65) Prior Publication Data
US 2012/0078645 A1 Mar. 29, 2012

(51) Int. Cl.
*G06Q 30/02* (2012.01)
(52) U.S. Cl.
CPC .................... *G06Q 30/02* (2013.01)
(58) Field of Classification Search
CPC ............... G06Q 30/0282; G06Q 30/02
USPC ............. 705/1.1, 347; 379/90.01, 93.12
See application file for complete search history.

(56) References Cited

U.S. PATENT DOCUMENTS

| | | | |
|---|---|---|---|
| 7,707,072 B2* | 4/2010 | Pierce | G06Q 30/02 705/26.25 |
| 2005/0220280 A1* | 10/2005 | Steinberg | 379/93.12 |
| 2006/0064304 A1* | 3/2006 | Greenstein et al. | 705/1 |
| 2006/0089873 A1 | 4/2006 | Stewart et al. | |
| 2008/0270193 A1 | 10/2008 | Beikmann | |
| 2009/0043596 A1* | 2/2009 | Pierce | 705/1 |
| 2009/0187501 A1 | 7/2009 | Winter et al. | |
| 2010/0049560 A1 | 2/2010 | Harris | |

OTHER PUBLICATIONS

Definition of recursive, Google search, Aug. 12, 2013.*
Definition of iterative, Google search, Aug. 12, 2013.*
"Pricing Strategies in the Mobile Phone Market." Borgermann et al. IEEE. 2009.
"T-Mobile Offers Clever Handset-Free Tariff." Tech Radar UK. Sep. 26, 2007.

* cited by examiner

*Primary Examiner* — Carrie S Gilkey
(74) *Attorney, Agent, or Firm* — Fabian VanCott

(57) ABSTRACT

Example embodiments relate to net utility determinations based on product replacement and coverage decisions of a customer. In example embodiments, a number of net utility values corresponding to each possible product replacement decision and each possible coverage decision in each of a plurality of time periods is determined. An expected net utility attributable to the customer over the plurality of time periods is then determined based on the determined utility values.

20 Claims, 4 Drawing Sheets

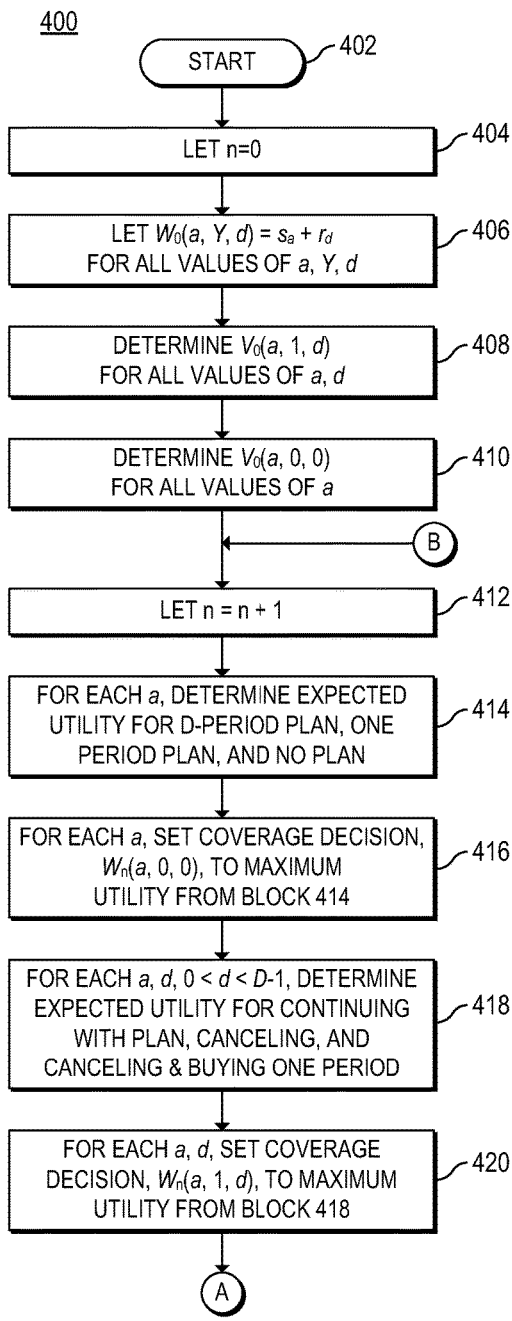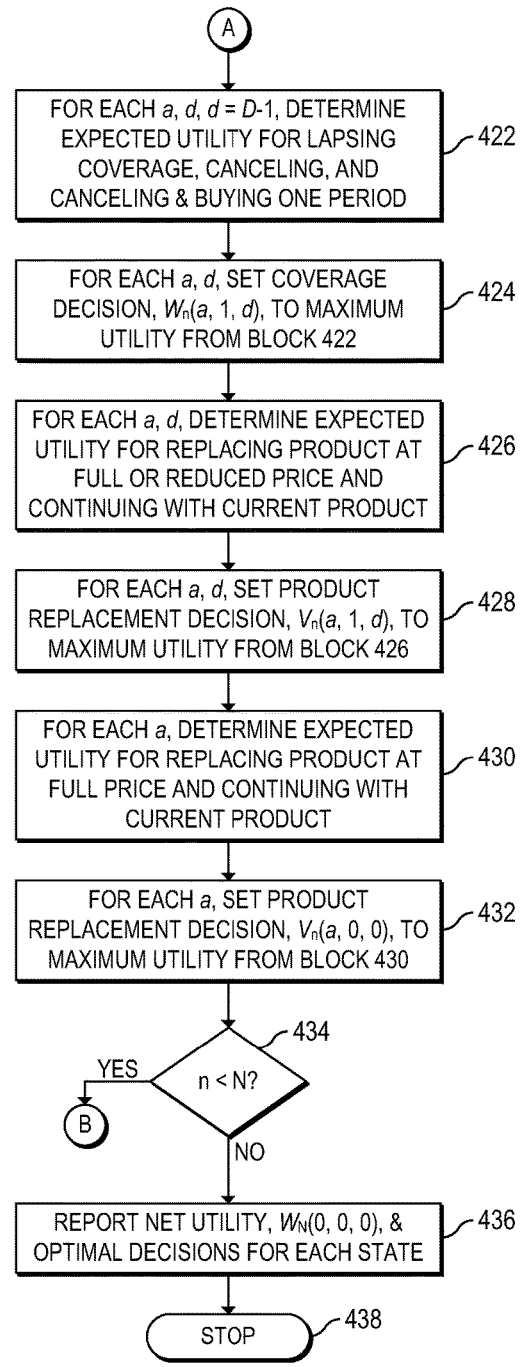
*FIG. 4A*
*FIG. 4B*

NET UTILITY DETERMINATION BASED ON PRODUCT REPLACEMENT AND SERVICE PLAN COVERAGE DECISIONS

BACKGROUND

Purchasers of mobile phones, wireless email devices, and other computing devices are faced with a seemingly infinite number of product and service plan choices. For example, when selecting a mobile phone, a consumer must generally select a phone, a wireless service provider, and a particular service plan offered by that provider. In addition, given the large number of phones available and the rapid advances in this technology area, consumers frequently face the choice of determining whether to upgrade to a new phone. Consumers face similar decisions when purchasing and using wireless email devices, tablet computers, and numerous other products.

BRIEF DESCRIPTION OF THE DRAWINGS

The following detailed description references the drawings, wherein:

FIGS. 4A & 4B are flowcharts of an example method for determining an expected net utility attributable to a customer over a plurality of time periods using a number of dynamic equations.

DETAILED DESCRIPTION

As detailed above, a customer faces many choices when selecting a product and a service plan for the product. Given the large number of choices, a customer may encounter difficulties when selecting a product and service plan that is most useful for him or her. Similarly, a provider of service plans and products may also encounter difficulties in designing and pricing service plans that are attractive to consumers and therefore increase revenue of the provider.

To address these issues, example embodiments disclosed herein relate to net utility determinations based on product replacement and service plan coverage decisions of a customer. For example, in some embodiments, a computing device may receive a request to determine an expected net utility attributable to a customer based on a product replacement decision and a service plan coverage decision of the customer for each of a number of time periods. In response, the computing device may determine a number of utility values corresponding to each possible product replacement decision and each possible service plan coverage decision in each of the time periods. The computing device may then determine the expected net utility attributable to the customer over the number of time periods based on a set of initial values and the determined utility values. In addition, in some embodiments, the computing device may then determine an expected profit earned by a provider based on the product replacement and service plan decisions of the customer.

Example embodiments disclosed herein thereby allow for a determination of the net utility to a customer of a series of product replacement decisions and service plan coverage decisions made over time. In this manner, a customer may select a product and service plan for the product that maximize the value of the product and plan to him or her. In addition, a service provider may determine an expected profit for a particular contract pricing and thereby evaluate various pricing schemes. Additional embodiments and applications of such embodiments will be apparent to those of skill in the art upon reading and understanding the following description.

Figure 1:
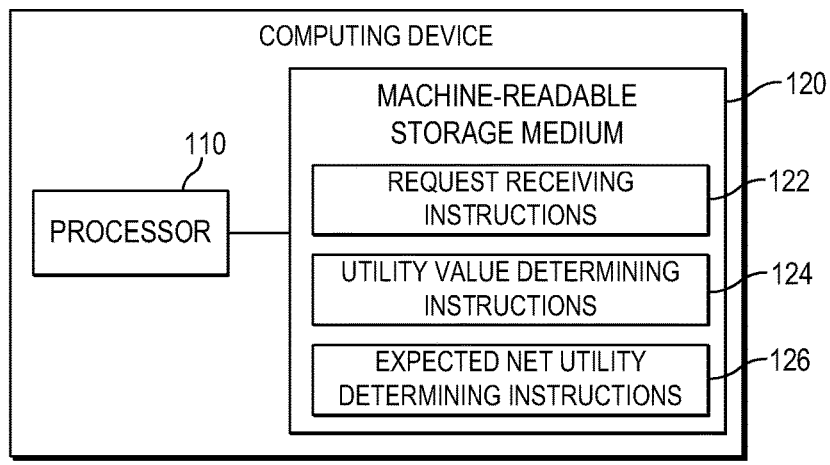
FIG. 1 is a block diagram of an example computing device for determining an expected net utility attributable to a customer based on product replacement and service plan coverage decisions for a plurality of time periods.

Referring now to the drawings, FIG. 1 is a block diagram of an example computing device 100 for determining an expected net utility attributable to a customer based on product replacement and service plan coverage decisions for a plurality of time periods. Computing device 100 may be, for example, a workstation, a server, a notebook computer, a desktop computer, an all-in-one system, a slate or tablet computer, or any other computing device suitable for execution of the functionality described below. In the implementation of FIG. 1, computing device 100 includes processor 110 and machine-readable storage medium 120.

Processor 110 may be one or more central processing units (CPUs), semiconductor-based microprocessors, and/or other hardware devices suitable for retrieval and execution of instructions stored in machine-readable storage medium 120. Processor 110 may fetch, decode, and execute instructions 122, 124, 126 to implement the net utility determining procedure described in detail below. In addition or as an alternative to retrieving and executing instructions, processor 110 may include one or more integrated circuits (ICs) or other electronic circuits that include a number of electronic components for performing the functionality of one or more of instructions 122, 124, 126.

Machine-readable storage medium 120 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read-Only Memory (CD-ROM), and the like. As described in detail below, machine-readable storage medium 120 may be encoded with executable instructions for determining an expected net utility attributable to a customer over a number of time periods.

Machine-readable storage medium 120 may include request receiving instructions 122, which may receive a request to determine an expected net utility attributable to a customer based on a product replacement decision and a service plan coverage decision of the customer for each of a plurality of time periods. For example, the customer, a service provider, or another user may issue an instruction to computing device 100 requesting that computing device 100 determine a net utility associated with an actual or hypothetical customer's usage of a product and subscription to a service plan. The net utility may correspond to a value quantifiable in the real-world, such as a monetary value in a predetermined currency (e.g., U.S. dollars, Euros, etc.). Alternatively, the net utility may represent a non-real world value that represents a degree of usefulness to the customer (e.g., points representing a value obtained by the customer).

Regardless of the nature of the utility value, the request may indicate that the user desires a quantifiable value corresponding to the customer's product usage and plan coverage over a number of periods (e.g., days, weeks, months, etc.) in a given horizon of time (e.g., 6 months, 1 year, 2 years, etc.). For example, a customer who currently owns a particular product or is contemplating a purchase of a product may desire to determine a value associated with his or her usage of the product and a corresponding decision that indicates whether to replace the product with a new product during each of the periods. The product may be, for example, a mobile phone, wireless email device, tablet or slate computer, laptop or desktop computer, or any other device for which the customer may purchase a service plan. In addition to the value of the product, the customer may also wish to determine the future value associated with his or her subscription to a service plan for the product and a corresponding decision that indicates whether to purchase the subscription plan during each of the periods. The subscription plan may be, for example, wireless phone service, Internet access, a music subscription, an online gaming service, or any other service that may be purchased for use with a particular product.

In response to receipt of the request, utility value determining instructions 124 may determine a plurality of utility values corresponding to each possible product replacement decision and each possible coverage decision in each of the plurality of corresponding time periods. For example, if the customer has the options of continuing with his or her old product and purchasing a new product in each period, determining instructions 124 may determine a utility associated with each of these options. Similarly, if the customer has the option of paying for a service plan or not paying for a service plan during each period, determining instructions 124 may also determine a utility associated with each of these options.

In some embodiments, utility value determining instructions 124 may determine each utility value using a mathematical model that includes a number of terms representing the parameters of the problem. For example, determining instructions 124 may utilize a number of dynamic equations, with a first set of dynamic equations representing the utility of each product replacement decision and a second set of dynamic equations representing the utility of each coverage decision. It should be noted that, although an example mathematical model is described as implemented with dynamic equations, these equations may be reformulated into a single set of equations.

The following dynamic equations are described based on a number of terms, where:

N is a total number of periods in the time horizon;

n is a number of time periods remaining in the time horizon, where n=0, 1, . . . , N;

a is the age of the currently-owned product, where a=0 corresponds to a new product;

$u_a^p$ is a utility value for a currently-owned product in a period in which the product is of age a and the customer has purchased the service plan;

$u_a^0$ is a utility value for a currently-owned product in a period in which the product is of age a and the customer has not purchased the service plan;

$p_F$ is the full price of a new product when fewer than T periods have elapsed in the customer's service plan;

$p_0$ is the discounted price of a new product when at least T periods have elapsed in the customer's service plan, as the provider may offer a discount on the product in such circumstances;

$q_D$ is the price of a D-period service plan commitment;

$q_0$, is the price of a one period service plan;

$r_d$ is a refund when canceling the service plan with d periods of coverage elapsed;

$s_a$ is the salvageable value of a product of age a at the end of the time horizon; and $\alpha$ is a discount factor applied to future cash flows.

As a specific example, the first set of dynamic equations may represent the utility value corresponding to the optimal product replacement decision in each time period, where n=0 is the last period. In particular, as detailed below, $V_n(a, Y, d)$ represents the customer's maximum total discounted expected utility over the next n periods before the product replacement decision. The state values in the equation may correspond to the age of the product, a, whether the customer is currently under a service contract, Y, where Y=1 if so and Y=0 if not, and a number of periods that have elapsed in the service contract, d. The customer's replacement decision and the corresponding utility in each period may be characterized by the following dynamic equations:

$$V_n(a,1,d)=\max\{W_n(0,1,d)-p_FI(d<T)-p_0I(d\geq T), W_n(a,1,d)\} \quad \text{[Equation 1]}$$

$$V_n(a,0,0)=\max\{W_n(0,0,0)-p_F, W_n(a,0,0)\} \quad \text{[Equation 2]}$$

As detailed above, Equation 1 represents the product replacement decision when the customer has a service plan during time period n. In particular, Equation 1 is a dynamic equation representing the customer's decision between: (a) replacing a product that is currently under a service plan for which d periods have elapsed with a new product; or (b) continuing with the current product. As represented in the equation, when d≥T, the customer is entitled to a discount on the product replacement and therefore pays the reduced price, $p_0$. Otherwise, when d<T, the customer pays the full price of the product, $p_F$.

Equation 2 represents the product replacement decision when the customer does not have a service plan during time period n. In particular, Equation 2 is a dynamic equation representing the customer's decision between: (a) replacing the product at a full price, $p_F$; and (b) continuing with the current product. Because the customer does not currently have a service plan, the customer is not entitled to a discount on the product.

The second set of dynamic equations may represent the utility value corresponding to the optimal coverage decision in each time period. In particular, as detailed below, $W_n(a, Y, d)$ represents the customer's maximum total discounted expected utility over the next n periods following the product replacement decision. As with $V_n$, the state values in the equation may correspond to the age of the product, a, whether the customer is currently under a service contract, Y, and a number of periods that have elapsed in the service contract, d. Thus, the customer's service plan decision and the corresponding utility in each period may be characterized by the following dynamic equations:

$$W_n(a,0,0)=\max\{u_a^p+q_D+\alpha V_{n-1}(a+1,1,1), u_a^0-q_0+\alpha V_{n-1}(a+1,0,0), u_a^0+\alpha V_{n-1}(a+1,0,0)\} \quad \text{[Equation 3]}$$

$$W_n(a,1,d)=\max\{u_a^p+\alpha V_{n-1}(a+1,1,d+1), u_a^0 r_d+\alpha V_{n-1}(a+1,0,0), u_a^p+r_d-q_0+\alpha V_{n-1}(a+1,0,0)\}, \text{ where } 0<d<D-1 \quad \text{[Equation 4]}$$

$$W_n(a,1,d)=\max\{u_a^P+\alpha V_{n-1}(a+1,0,0), u_a^O+r_d+\alpha V_{n-1}(a+1,0,0), u_a^P+r_d-q_0+\alpha V_{n-1}(a+1,0,0)\}, \text{ where}$$
$$d=D-1 \qquad \text{[Equation 5]}$$

As detailed above, Equation 3 represents the coverage decision when the customer does not have a service plan during time period n. In particular, Equation 3 is a dynamic equation representing the customer's decision between: (a) purchasing a D period service plan commitment at price $q_D$; (b) purchasing a single period of service at price $q_0$; and (c) purchasing no service plan.

Equation 4 represents the service plan coverage decision when the customer has a service plan during time period n and $0<d<D-1$ (i.e., when at least one time period of coverage remains for the service plan after the current period). In particular, Equation 4 is a dynamic equation representing the customer's decision between: (a) continuing under a service plan with d periods elapsed; (b) canceling the service plan with refund $r_d$ and continuing uncovered; and (c) canceling the service plan with refund $r_d$ and purchasing a single period of service at price $q_0$.

Equation 5 represents the service plan coverage decision when the customer has a service plan during the time period, n, and $d=D-1$ (i.e., when the customer is in the last period of coverage for the service plan). In particular, Equation 5 is a dynamic equation representing the customer's decision between: (a) allowing the current service plan to lapse; (b) canceling the service plan with refund $r_d$ and continuing uncovered; and (c) canceling the service plan with refund $r_d$ and purchasing a single period of service at price $q_0$.

In operation, utility value determining instructions 124 may use the dynamic equations described above to determine a utility value associated with each possible replacement decision and each possible service plan coverage decision during each time period. Determining instructions 124 may then identify, based on these values, the utility value corresponding to the optimal decision (i.e., the maximum utility value for a particular set of state values). In other words, beginning with the last time period in the horizon (i.e., when n=0) and moving closer in time (i.e., increasing n), determining instructions 124 may determine a utility value for all possible values of a, Y, and d.

Utility value determining instructions 124 may initially determine a first plurality of boundary values for the set of dynamic equations representing the coverage decision. In other words, determining instructions 124 may determine the value of $W_0(a, Y, d)$ for each possible value of a, Y, and d, where $W_0(a, Y, d)=s_a+r_d$ (i.e., the salvage value plus any contract refund). Thus, determining instructions 124 may first determine the value of $W_0(a, 1, a)$ for all possible age values, a, and contract elapsed values, d. Determining instructions 124 may then determine the value of $W_0(a, 0, 0)$ for all possible age values, a.

In addition, utility value determining instructions 124 may determine a second plurality of boundary values for the set of dynamic equations representing the product replacement decision. In other words, determining instructions 124 may determine the value of $V_0(a, Y, d)$ for each possible value of a, Y, and d. Thus, determining instructions 124 may first determine the value of $V_0(a, 1, d)$ for all possible age values, a, and contract elapsed values, d. Determining instructions 124 may then determine the value of $V_0(a, 0, 0)$ for all possible age values, a. Because $V_0(a, Y, d)$ is defined based on $W_0(a, Y, d)$, determining instructions 124 may use the boundary values previously computed for $W_0(a, Y, d)$ when computing $V_0(a, Y, d)$.

Next, based on the computed boundary conditions, utility value determining instructions 124 may recursively determine utility values corresponding to each possible product replacement decision and each possible coverage decision in each remaining period of the plurality of time periods. In other words, starting with n=1, determining instructions 124 may first determine $W_n(a, Y, d)$ for each set of values, a, Y, and d, and then determine $V_n(a, Y, d)$. Determining instructions 124 may then increment n and continue with this procedure until n=N.

After determining instructions 124 derive utility values for each possible replacement decision and each possible coverage decision, expected net utility determining instructions 126 may determine the expected net utility value attributable to the customer over the plurality of time periods based on a set of initial values and the plurality of determined utility values. For example, when using the dynamic equations described above, determining instructions 126 may determine the expected net utility as the value of $W_N(a, Y, d)$ for a particular set of initial state values, a, Y, d. To give a specific example, when the customer has a brand new product (age a=0), determining instructions 126 may determine the expected net utility as $W_N(0, 0, 0)$. As another example, when the customer initially has a product, determining instructions 126 may determine the expected net utility as $W_N(a, 0, 0)$, where a is the age of the currently-owned product. Other starting conditions may be represented by various combinations of a, Y, and d.

Figure 2:
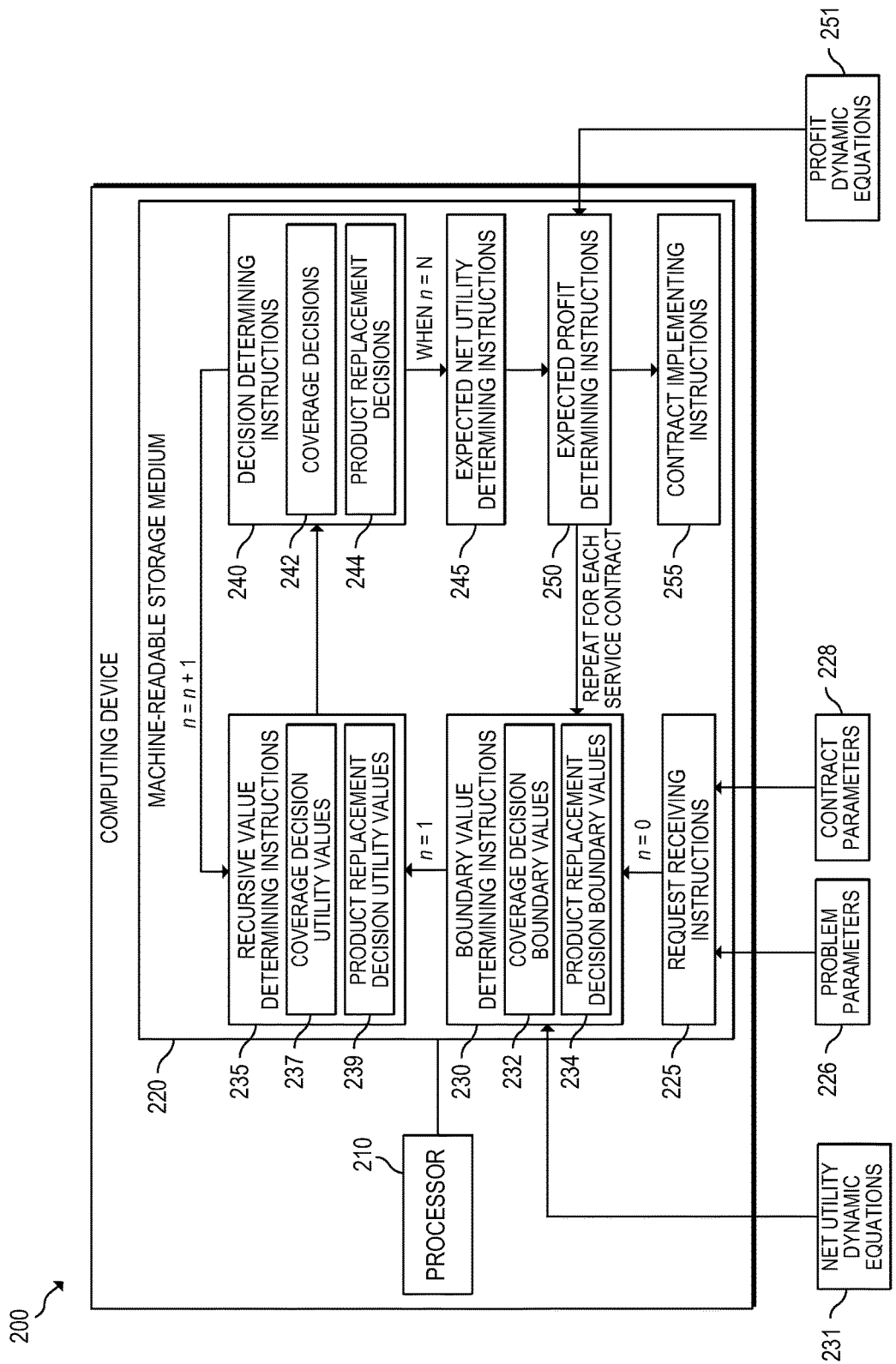
FIG. 2 is a block diagram of an example computing device for determining, for each of a plurality of service contracts, an expected net utility attributable to a customer, service plan coverage and product replacement decisions, and an expected profit of a provider.

FIG. 2 is a block diagram of an example computing device 200 for determining, for each of a plurality of service contracts, an expected net utility attributable to a customer, coverage and product replacement decisions, and an expected profit of a provider. As with computing device 100 of FIG. 1, computing device 200 may be, for example, a workstation, a server, a notebook computer, a desktop computer, an all-in-one system, a slate or tablet computer, or any other computing device suitable for execution of the functionality described below. In the implementation of FIG. 2, computing device 200 includes processor 210 and machine-readable storage medium 220.

As with processor 110, processor 210 may be a CPU or microprocessor suitable for retrieval and execution of instructions and/or one or more electronic circuits configured to perform the functionality of one or more of instructions 225, 230, 235, 240, 245, 250, 255 described below. Machine-readable storage medium 220 may be any electronic, magnetic, optical, or other physical storage device that contains or stores executable instructions. As described in detail below, machine-readable storage medium 220 may be encoded with executable instructions for determining an expected net utility attributable to a customer based on product replacement and coverage decisions of the customer.

Machine-readable storage medium 220 may include request receiving instructions 225, which may receive a request to determine an expected net utility attributable to a customer based on a service plan coverage decision and a product replacement decision of the customer for a plurality of corresponding time periods. The request may be received from a customer, a service provider, or another user and may instruct computing device 200 to determine the expected net utility, the coverage and product replacement decisions, and an expected profit attributable to a service provider.

Request receiving instructions 225 may receive a number of parameters 226, 228 to be used in determining the net utility and an expected profit earned by the service provider. For example, request receiving instructions 225 may receive problem parameters 226, which may specify a total number of time periods in the time horizon, utility values for a product when the customer has a service plan and does not have a service plan, a salvage value of the product at the end of the time horizon for each of a number of possible age values, and a discount factor. In addition, request receiving instructions 225 may receive contract parameters 228 for each of one or more contracts. Each set of contract parameters 228 may include, for example, full and discounted product prices, service plan prices, refund amounts, the cost of providing the service incurred by the provider, and the hardware cost of the product to the provider.

Upon receipt of the request and parameters 226, 228, computing device 200 may trigger boundary value determining instructions 230. In some embodiments, computing device 200 may determine the expected net utility using a set of net utility dynamic equations 231, such as Equations 1-5, detailed above. In such embodiments, boundary value determining instructions 230 may first determine coverage decision boundary values 232 using the set of dynamic equations representing the coverage decision (i.e., Equations 3-5) for each possible set of state values during the last time period. Boundary value determining instructions 230 may then determine product replacement decision boundary values 234 using the set of dynamic equations representing the product replacement decision (i.e., Equations 1 and 2) for each possible set of state values during the last time period. These boundary values may be based on the salvage values and refund amounts as specified by problem parameters 226 and contract parameters 228, respectively. Additional details regarding an example process for determining boundary values 232, 234 are provided above in connection with utility value determining instructions 124 of FIG. 1.

After determining boundary values 232, 234 for dynamic equations 231, computing device 200 may trigger recursive value determining instructions 235, which may recursively determine the expected net utility values 237, 239 for each possible coverage decision and each possible product replacement decision in each remaining period of the plurality of periods. For example, determining instructions 235 may recursively determine coverage decision utility values 237 for each set of state values for each time period n, where n=1 to N, using Equations 3-5, detailed above. Similarly, determining instructions 235 may recursively determine product replacement decision utility values 239 for each set of state values for each time period n, where n=1 to N, using Equations 1 and 2, also detailed above.

Because determining instructions 235 may operate recursively, each expected net utility value for each possible coverage decision may be based on an immediate utility value in a current time period and the expected net utility value of the product replacement decision from a next time period. In other words, the utility value for a period n from a given coverage decision is based on the utility gained by use of the product with or without a service plan (i.e., $u_a^P$ or $u_a^0$) and the utility earned from the next time period onward, based on the product replacement decision (i.e., $V_{n-1}(a, Y, d)$ for some set of state values a, Y, d.

Decision determining instructions 240 may determine a number of service plan coverage decisions 242 and product replacement decisions 244 based on each possible coverage decision and product replacement decision. For example, determining instructions 240 may determine each service plan coverage decision for each possible set of state values by determining the expected net utility value and identifying the component of the dynamic equation that corresponds to the maximum value. The identified component of the corresponding dynamic equation represents the service coverage decision for that set of state values.

As an example, suppose that the particular dynamic equation for a given set of state values is Equation 3, detailed above. To give a specific example, the coverage decision for a particular time period, where n=3, and a particular product age, where a=6, is represented by $W_3(6, 0, 0)$. As detailed above, $W_3(6, 0, 0)$ is equal to the maximum of a first component representing the decision to purchase a D period plan, a second component representing the decision to purchase a single period of service, and a third component representing the decision to not purchase a plan. Thus, as an example, if $W_3(6, 0, 0)$ equals the value of the first component, the coverage decision is to purchase a D period plan. Determining instructions 240 may therefore record the decision for the particular set of state values, where a=6, Y=0, and d=0. Determining instructions 240 may repeat this process to determine the coverage decisions 242 for each possible set of state values, a, Y, and d, for each time period.

Determining instructions 240 may similarly determine the product replacement decision 244 for each set of state values for each time period. Rather than using Equations 3-5, however, determining instructions 240 may use Equations 1 and 2.

After execution of recursive value determining instructions 235 and decision determining instructions 240 for all values of n for n=0 to N, computing device 200 may trigger expected net utility determining instructions 245. Determining instructions 245 may determine the expected net utility attributable to the customer over the plurality of time periods using a set of initial values and the determined utility values for each time period. Additional details of an example procedure executed by determining instructions 245 are provided above in connection with expected net utility determining instructions 126 of FIG. 1.

Expected profit determining instructions 250 may determine, for each set of contract parameters 228, an expected profit earned by a provider over the plurality of time periods based on each service plan decision and each product replacement decision of the customer for each of the time periods. As with the expected net utility, expected profit determining instructions 250 may determine the profit value using a mathematical model including a number of dynamic equations 251. For example, determining instructions 250 may utilize two sets of dynamic equations 251, one set representing the expected profit earned by the provider based on each product replacement decision of the customer and another set representing the expected profit earned by the provider based on each coverage decision. It should be noted that, although an example mathematical model is described as implemented with dynamic equations 251, these equations may be reformulated into a single set of equations.

The following dynamic equations are described based on the terms used in Equations 1-5, detailed above, and several additional terms, where:

$c_s$ is a cost incurred by the provider in providing service to a given customer for one time period; and $c_h$ is a cost incurred by the provider in sourcing or manufacturing a particular product to be sold to customers.

As a specific example, the first set of dynamic equations may represent an expected profit earned by the provider based on the product replacement decision in each time period. In particular, as detailed below, $V\Pi_n(a, Y, d)$ represents the provider's total discounted expected profit from a customer in state (a, Y, d) over the next n periods before the product replacement decision. State values a, Y, d are identical to the state values used in determining the expected net utility. As detailed below, the profit of the provider in a particular period depends on the product replacement decision 244 determined for the particular set of state values in the particular time period. Thus, when there are n periods remaining, the product is age a and is currently covered by a service plan (i.e., when Y=1), and d periods of the service plan have elapsed, the profit of the provider may be characterized by the following dynamic equations:

If $W_n(0, 1, d) - p_F I(d<T) - p_O I(d \geq T) \geq W_n(a, 1, d)$, then the customer replaces the product, and $$V\Pi_n(a,1,d) = p_F I(d<T) + p_O I(d \geq T) - c_h + W\Pi_n(0,1,d) \quad \text{[Equation 6]}$$

Otherwise, the customer continues using the current product, and $$V\Pi_n(a,1,d) = W\Pi_n(a,1,d) \quad \text{[Equation 7]}$$

Alternatively, when there are n periods remaining and the product is of age a and is not currently covered by a service plan (i.e., when Y=0), the profit of the provider may be characterized by the following dynamic equations:

If $W_n(0, 0, 0) - p_F \geq W_n(a, 0, 0)$, then the customer replaces the product at the full price, and $$V\Pi_n(a,0,0) = p_F c_h + W\Pi_n(0,0,0) \quad \text{[Equation 8]}$$

Otherwise, the customer continues using the current product, and $$V\Pi_n(a,0,0) = W\Pi_n(a,0,0) \quad \text{[Equation 9]}$$

The second set of dynamic equations may represent an expected profit earned by the provider based on the service plan coverage decision in each time period. In particular, as detailed below, $W\Pi_n(a, Y, d)$ represents the provider's total discounted expected profit from a customer over the next n periods following the product replacement decision. As detailed below, the profit of the provider in a particular period depends on the coverage decision 242 determined for the particular set of state values. Thus, when there are n periods remaining, the product is age a and is not currently covered by a service plan (i.e., when Y=0), the profit of the provider may be characterized by the following dynamic equations:

If $u_a^P - q_D + \alpha V_{n-1}(a+1, 1, 1) \geq \max\{u_a^P - q_0 + \alpha V_{n-1}(a+1, 0, 0), u_a^0 + \alpha V_{n-1}(a+1, 0, 0)\}$, then the customer purchases a D period service plan commitment, and $$W\Pi_n(a,0,0) = q_D - c_s + \alpha V\Pi_{n-1}(a+1,1,1) \quad \text{[Equation 10]}$$

Alternatively, if $u_a^P - q_0 + \alpha V_{n-1}(a+1, 0, 0) \geq \max\{u_a^P - q_D + \alpha V_{n-1}(a+1, 1, 1), u_a^0 \alpha V_{n-1}(a+1, 0, 0)\}$, then the customer purchases a single period of service, and $$W\Pi_n(a,0,0) = q_0 - c_s + \alpha \Pi_{n-1}(a+1,0,0) \quad \text{[Equation 11]}$$

Otherwise, the customer continues without a service plan, and $$W\Pi_n(a,0,0) = \alpha V\Pi_{n-1}(a+1,0,0) \quad \text{[Equation 12]}$$

Alternatively, when there are n periods remaining, the product is age a and is covered (i.e., when Y=1), and at least one time period of coverage remains for the service plan after the current period (i.e., when d<D−1), the profit of the provider may be characterized by the following dynamic equations:

If $u_a^P + \alpha V_{n-1}(a+1, 1, d+1) \geq \max\{u_a^0 + r_d + \alpha V_{n-1}(a+1, 0, 0), u_a^P + r_d - q_0 + \alpha V_{n-1}(a+1, 0, 0)\}$, then the customer continues with the service plan, and $$W\Pi_n(a,1,d) = -c_s + \alpha V\Pi_{n-1}(a+1,1,d+1) \quad \text{[Equation 13]}$$

Alternatively, if $u_a^0 + r_d + \alpha V_{n-1}(a+1, 0, 0) \geq \max\{u_a^P + \alpha V_{n-1}(a+1, 1, d+1), u_a^P + r_d - q_0 + \alpha V_{n-1}(a+1, 0, 0)\}$, then the customer cancels the service plan and continues uncovered, and $$W\Pi_n(a,1,d) = -r_d + \alpha V\Pi_{n-1}(a+1,0,0) \quad \text{[Equation 14]}$$

Otherwise, the customer cancels the service plan and buys a single period of service, and $$W\Pi_n(a,1,d) = -r_d + q_0 - c_s + \alpha V\Pi_{n-1}(a+1,0,0) \quad \text{[Equation 15]}$$

Finally, when there are n periods remaining, the product is age a and is covered (i.e., when Y=1), and the customer is in the last period of coverage (i.e., when d=D−1), the profit of the provider may be characterized by the following dynamic equations:

If $u_a^P + \alpha V_{n-1}(a+1, 0, 0) \geq \max\{u_a^0 + r_d + \alpha V_{n-1}(a+1, 0, 0), u_a^P + r_d - q_0 + \alpha V_{n-1}(a+1, 0, 0)\}$, then the customer allows the service plan to lapse, and $$W\Pi_n(a,1,d) = -c_s + \alpha V\Pi_{n-1}(a+1,0,0) \quad \text{[Equation 16]}$$

Alternatively, if $u_a^0 + r_d + \alpha V_{n-1}(a+1, 0, 0) \geq \max\{u_a^P \alpha V_{n-1}(a+1, 0, 0), u_a^P + r_d - q_0 + \alpha V_{n-1}(a+1, 0, 0)\}$, then the customer cancels the service plan and continues uncovered, and $$W\Pi_n(a,1,d) = -r_d + \alpha V\Pi_{n-1}(a+1,0,0) \quad \text{[Equation 17]}$$

Otherwise, the customer cancels the service plan and buys a single period of service, and $$W\Pi_n(a,1,d) = -r_d + q_0 - c_s + \alpha V\Pi_{n-1}(a+1,0,0) \quad \text{[Equation 18]}$$

In operation, expected profit determining instructions 250 may use the dynamic equations described above and the decisions 242, 244 to determine an expected profit value associated with each possible replacement decision and each possible coverage decision during each time period. In other words, beginning with the last time period in the horizon (i.e., when n=0) and moving closer in time (i.e., increasing n), determining instructions 250 may determine an expected profit value for all possible values of a, Y, and d.

Thus, expected profit determining instructions 250 may first determine a plurality of boundary values for the set of dynamic equations representing the profit corresponding to each coverage decision. In other words, determining instructions 250 may determine the value of $W\Pi_0(a, Y, d)$ for all possible values using the boundary conditions $W\Pi_0(a, 1, d) = V\Pi_0(a, 1, d) = -r_d$ and $W\Pi_0(a, 0, 0) = V\Pi_0(a, 0, 0) = 0$. Expected profit determining instructions 250 may then determine a plurality of boundary values for the set of dynamic equations representing the profit corresponding to each product replacement decision (i.e., $V\Pi_0(a, Y, d)$) using the same boundary conditions.

Next, based on the computed boundary conditions, expected profit determining instructions 250 may then recursively determine profit values corresponding to each possible product replacement decision and each possible coverage decision in each remaining time period. In other words, starting with n=1, determining instructions 250 may first determine $W\Pi_n(a, Y, d)$ for each set of state values, a, Y, d, and then determine $V\Pi_n(a, Y, d)$. Determining instructions 250 may then increment n and continue with this procedure until n=N.

After deriving profit values, determining instructions 250 may determine the expected profit attributable to the service provider over the plurality of time periods based on a set of initial values. For example, determining instructions may determine the expected profit for the particular set of contract parameters 228 as the value $W\Pi_N(a, Y, d)$ for a particular set of initial state values, such as a=0, Y=0, and d=0.

Contract implementing instructions 255 may, based on the expected profit determined for each set of contract parameters 228, identify the particular contract that maximizes the profit of the provider. In some embodiments, contract implementing instructions 255 may then implement the particular terms of the contract. For example, computing device 200 may control or be linked to a system that controls fulfillment of contracts based on a number of contract terms, such as the price per period, full and discounted product prices, refund values, etc. In such embodiments, contract implementing instructions 255 may dynamically set the terms of the contract based on the parameters 228 that maximize the provider's profit. Alternatively, contract implementing instructions 255 may output the parameters 228 of the identified contract, such that the terms of the contract may be manually implemented.

Figure 3:
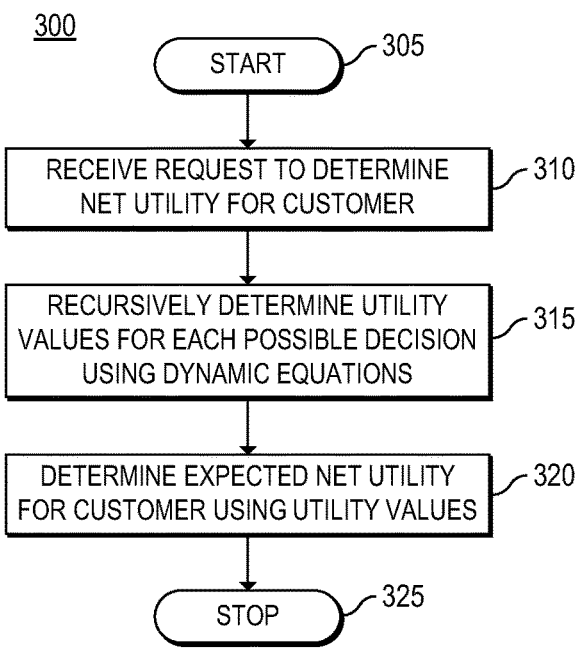
FIG. 3 is a flowchart of an example method for determining an expected net utility attributable to a customer based on product replacement and service plan coverage decisions for a plurality of time periods.

FIG. 3 is a flowchart of an example method 300 for determining an expected net utility attributable to a customer based on product replacement and coverage decisions for a plurality of time periods. Although execution of method 300 is described below with reference to computing device 100, other suitable components for execution of method 300 will be apparent to those of skill in the art (e.g., computing device 200). Method 300 may be implemented in the form of executable instructions stored on a machine-readable storage medium, such as storage medium 120, and/or in the form of electronic circuitry.

Method 300 may start in block 305 and proceed to block 310, where computing device 100 may receive a request to determine an expected net utility attributable to a customer over a number of time periods based on a product replacement decision and a service plan coverage decision for each of the time periods. This request may specify, for example, a number of values for terms used in a set of dynamic equations. For example, the request may specify the number of time periods, utility values for the product when the customer has and does not have a service plan, product prices, service plan prices, service plan refunds, a salvage value of the product for each of a plurality of age values, and a discount factor.

After computing device 100 receives a request, method 300 may proceed to block 315, where computing device 100 may recursively determine utility values for each possible product replacement decision and each possible coverage decision during each of the time periods. For example, computing device 100 may initially determine a number of boundary utility values for each set of state values using a set of dynamic equations, such as Equations 1-5, detailed above. Computing device 100 may then recursively determine utility values for each possible set of state values in each remaining time period based on application of the dynamic equations.

After computing device 100 has determined a utility value for the product replacement decision and coverage decision for each set of state values in each time period, method 300 may proceed to block 320. In block 320, computing device 100 may determine the expected net utility for the customer based, for example, on the value of the dynamic equation corresponding to the coverage decision for an initial set of state values in the first time period. Computing device 100 may then, for example, output the determined net utility value to a display device and, in some embodiments, may also output the product replacement decision and the coverage decision for each time period. Method 300 may then proceed to block 325, where method 300 may stop.

FIGS. 4A & 4B are flowcharts of an example method 400 for determining an expected net utility attributable to a customer over a plurality of time periods using a number of dynamic equations. Although execution of method 400 is described below with reference to computing device 200, other suitable components for execution of method 400 will be apparent to those of skill in the art. Method 400 may be implemented in the form of executable instructions stored on a machine-readable storage medium, such as storage medium 220, and/or in the form of electronic circuitry.

Referring now to FIG. 4A, method 400 may start in block 402 and proceed to block 404, where computing device 200 may initialize n to 0, such that n represents the last time period in the time horizon to be analyzed. Method 400 may then proceed to blocks 406, 408, and 410, where computing device 200 may determine a boundary condition utility value for each set of state values for a set of equations corresponding to the coverage decision (e.g., Equations 3-5) and for a set of equations corresponding to the product replacement decision (e.g., Equations 1-2). Thus, in block 406, computing device 200 may determine $W_0(a, Y, d)$ to be $s_a + r_d$ (i.e., the salvage value plus any contract refund) for each set of state values, a, Y, d. In block 408, computing device 200 may determine $V_0(a, 1, d)$ for all values of a and d using Equation 1. In block 410, computing device 200 may determine $V_0(a, 0, 0)$ for all values of a using Equation 2. Method 400 may then proceed to block 412, where computing device 200 may increment n by 1, such that n represents a previous period of time in the horizon.

Method 400 may then proceed to blocks 414-424, where computing device 200 may determine the coverage decision and the expected net utility associated with that decision for all possible state values. For example, in block 414, computing device 200 may determine the expected utility for each possible coverage decision when the customer does not have a service plan and has a product of age a.

For example, using Equation 3, computing device 200 may determine the utility of each component of $W_n(a, 0, 0)$, for all values of a. Thus, for a given value a, computing device 200 may determine the first utility value, $u_a^P - q_D + \alpha V_{n-1}(a+1, 1, 1)$, which corresponds to the expected net utility value when the customer purchases a D-period plan. Computing device 200 may then determine the second utility value, $u_a^P - q_0 + \alpha V_{n-1}(a+1, 0, 0)$, which corresponds to the expected net utility when the customer purchase a one period service plan. Finally, computing device 200 may determine the third utility value, $u_a^0 + \alpha V_{n-1}(a+1, 0, 0)$, which corresponds to the expected net utility when the customer does not purchase a service plan. In block 416, computing device 200 may determine the expected net utility, $W_n(a, 0, 0)$, as the maximum of the three components and may set the coverage decision to the decision corresponding to the maximum component. Method 400 may then proceed to block 418.

In block 418, computing device 200 may determine the expected utility for each possible coverage decision when the customer has a service plan for a product of age a for which d periods have elapsed and at least one period of service remains after the current period (i.e., when $0<d<D-1$). For example, using Equation 4, computing device 200 may determine the utility of each component of $W_n(a, 1, d)$, for all values of a and d. Thus, for a given set of values a and d, computing device 200 may determine the first utility value, $u_a^P + \alpha V_{n-1}(a+1, 1, d+1)$, which corresponds to the expected net utility when the customer continues under the current service plan. Computing device 200 may then determine the second utility value, $u_a^0 + r_d + \alpha V_{n-1}(a+1, 0, 0)$, which corresponds to the expected net utility when the customer cancels the current service plan. Finally, computing device 200 may determine the third utility value, $u_a^P + r_d - q_0 + \alpha V_{n-1}(a+1, 0, 0)$, which corresponds to the expected net utility when the customer cancels the plan and purchases a single period of coverage. In block 420, computing device

200 may determine the expected net utility, $W_n(a, 1, d)$, as the maximum of the three components and may set the coverage decision to the decision corresponding to the maximum component. Method 400 may then proceed to block 422 of FIG. 4B.

Referring now to FIG. 4B, in block 422, computing device 200 may determine the expected utility for each possible coverage decision when the customer has a service plan for a product of age a for which d periods have elapsed and the customer is in the last period of the service plan (i.e., when d=D−1). For example, using Equation 5, computing device 200 may determine the utility of each component of $W_n(a, 1, d)$, for all values of a and d. Thus, for a given set of values a and d, computing device 200 may determine the first utility value, $u_a^P + \alpha V_{n-1}(a+1, 0, 0)$, which corresponds to the expected net utility when the customer allows the service plan to lapse. Computing device 200 may then determine the second utility value, $u_a^0 + r_d + \alpha V_{n-1}(a+1, 0, 0)$, which corresponds to the expected net utility when the customer cancels the current service plan. Finally, computing device 200 may determine the third utility value, $u_a^P + r_d - q_0 + \alpha V_{n-1}(a+1, 0, 0)$, which corresponds to the expected net utility when the customer cancels the plan and purchases a single period of coverage. In block 424, computing device 200 may determine the expected net utility, $W_n(a, 1, d)$, as the maximum of the three components and may set the coverage decision to the decision corresponding to the maximum component. Method 400 may then proceed to block 426.

In block 426, computing device 200 may determine the expected utility for each possible product replacement decision when the customer has a service plan for a product of age a for which d periods have elapsed. For example, using Equation 1, computing device 200 may determine the utility of each component of $V_n(a, 1, d)$, for all values of a and d. Thus, for a given set of values a and d, computing device 200 may determine the first utility value, $W_n(0, 1, d) - p_F I(d<T) - p_0 I(d \geq T)$, which corresponds to the expected net utility when the customer replaces the product at a full or reduced price, depending on the number of periods elapsed in the plan. Computing device may then determine the second utility value, $W_n(a, 1, d)$, which corresponds to the expected net utility when the customer continues with the current product. In block 428, computing device 200 may determine the expected net utility, $V_n(a, 1, d)$, as the maximum of the two components and may also set the product replacement decision to the decision corresponding to the maximum component. Method 400 may then proceed to block 430.

In block 430, computing device 200 may determine the expected utility for each possible product replacement decision when the customer does not have a service plan for a product of age a. For example, using Equation 2, computing device 200 may determine the utility of each component of $V_n(a, 0, 0)$, for all values of a. Thus, for a given a, computing device 200 may determine the first utility value, $W_n(0, 0, 0) - p_F$, which corresponds to the expected net utility when the customer replaces the product at a full price. Computing device may then determine the second utility value, $W_n(a, 0, 0)$, which corresponds to the expected net utility when the customer continues with the current product. In block 432, computing device 200 may determine the expected net utility, $V_n(a, 0, 0)$, as the maximum of the two components and may also set the product replacement decision to the decision corresponding to the maximum component.

Method 400 may then proceed to block 434, where computing device 200 may determine whether n is less than N, where N is the total number of periods in the horizon. If so, method 400 may return to block 412 for determination of each possible product replacement decision and each possible coverage decision for the previous period in time. Otherwise, when n is currently equal to N, computing device 200 may determine that it has processed all time periods in the horizon. Accordingly, method 400 may proceed to block 436.

In block 436, computing device 200 may determine the expected net utility attributable to the customer as $W_N(a, Y, d)$ for a selected set of state values. For example, assuming that the customer has a new product with no service plan at the beginning of the time horizon, computing device 200 may output $W_N(0, 0, 0)$ to an available display device. In addition, computing device 200 may also output each product replacement and each coverage decision for each time period based on the initial set of state values. For example, beginning with the initial set of state values, computing device 200 may traverse each time period from n=N to n=0, outputting the determined product replacement decision and the determined coverage decision for the current set of state values. After outputting the expected net utility and the optimal decisions for each state, method 400 may proceed to block 438, where method 400 may stop.

Figure 5A:
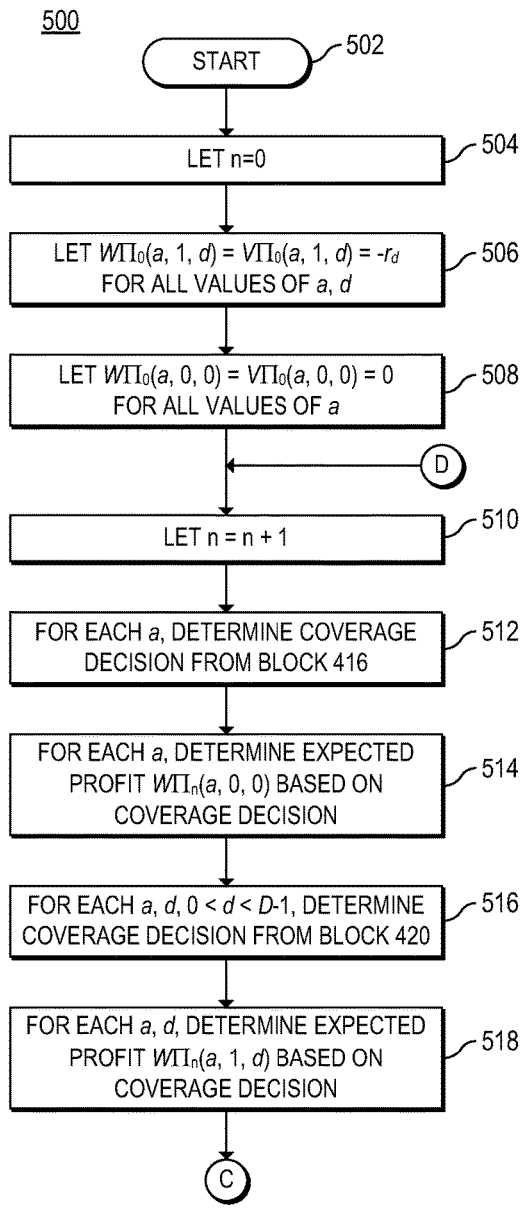
FIGS. 5A & 5B are flowcharts of an example method for determining an expected profit earned by a provider over a plurality of time periods using a number of dynamic equations.
Figure 5B:
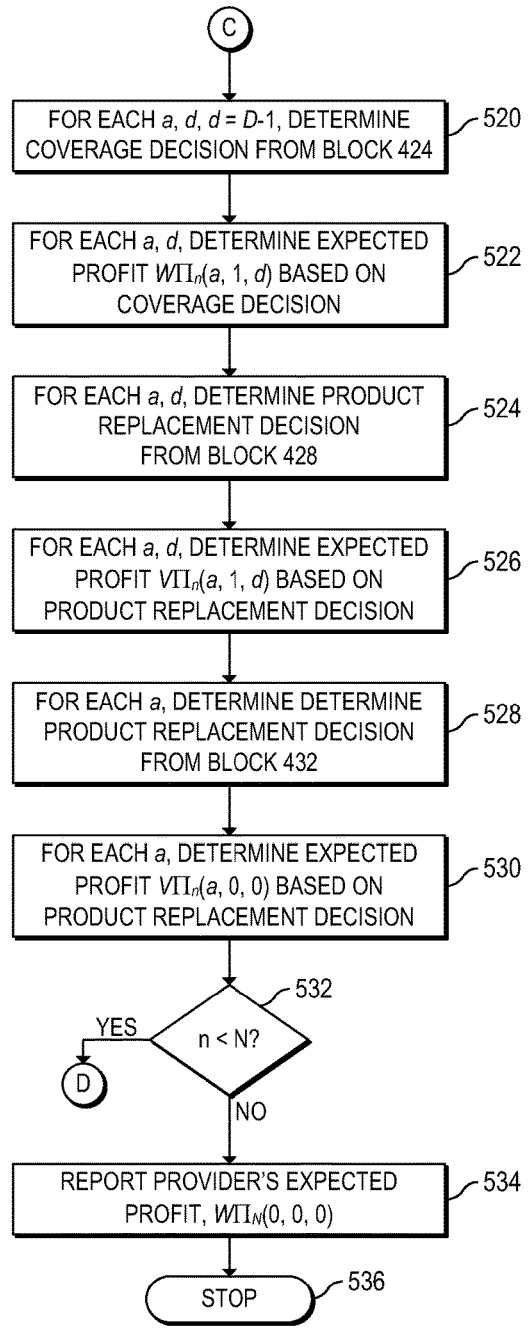

FIGS. 5A & 5B are flowcharts of an example method 500 for determining an expected profit earned by a provider over a plurality of time periods using a number of dynamic equations. Although execution of method 500 is described below with reference to computing device 200, other suitable components for execution of method 500 will be apparent to those of skill in the art. Method 500 may be implemented in the form of executable instructions stored on a machine-readable storage medium, such as storage medium 220, and/or in the form of electronic circuitry.

Referring to FIG. 5A, method 500 may start in block 502 and proceed to block 504, where computing device 200 may initialize n to 0, such that n represents the last time period in the time horizon to be analyzed. Method 500 may then proceed to blocks 506 and 508, where computing device 200 may determine a boundary condition profit value for each set of state values for a set of equations corresponding to the coverage decision (e.g., Equations 10-18) and for a set of Equations corresponding to the product replacement decision (e.g., Equations 6-9). Thus, in block 506, computing device 200 may determine $W\Pi_n(a, 1, d)$ and $V\Pi_n(a, 1, d)$ to be $-r_d$ for all values of a and d. In block 508, computing device 200 may determine $W\Pi_n(a, 0, 0)$ and $V\Pi_n(a, 0, 0)$ to be 0 for all values of a. Method 500 may then proceed to block 510, where computing device 200 may increment n by 1, such that n represents a previous period of time in the horizon.

Method 500 may then proceed to block 512, where computing device 200 may determine the coverage decision from block 416 of FIG. 4A for each value of a. In block 514, computing device 200 may then determine the expected profit of the provider using a set of dynamic equations that are based on the service plan decision when the customer does not have a service plan during time period n. For example, when the service plan decision from block 416 indicates that the customer purchases a D period service plan commitment, computing device 200 may determine $W\Pi_n(a, 0, 0)$ using Equation 10. Alternatively, when the service plan decision from block 416 indicates that the customer purchases a single period of service, computing device 200 may determine $W\Pi_n(a, 0, 0)$ using Equation 11. Finally, when the service plan decision from block 416 indicates that the customer continues without a service plan, computing device 200 may determine $W\Pi_n(a, 0, 0)$ using Equation 12.

Method 500 may then proceed to block 516, where computing device 200 may determine the coverage decision from block 420 of FIG. 4A for each set of values, a and d, where 0<d<D-1. In block 518, computing device 200 may then determine the expected profit of the provider using a set of dynamic equations that are based on the service plan decision when the customer has a service plan during time period n and at least one period of service remains after the current period (i.e., when d<D-1). For example, when the service plan decision from block 420 indicates that the customer continues with the service plan, computing device 200 may determine $WII_n(a, 1, d)$ using Equation 13. Alternatively, when the service plan decision from block 420 indicates that the customer cancels the service plan and continues uncovered, computing device 200 may determine $WII_n(a, 1, d)$ using Equation 14. Finally, when the service plan decision from block 420 indicates that the customer cancels the service plan and buys a single period of service, computing device 200 may determine $WII_n(a, 1, d)$ using Equation 15.

Method 500 may then proceed to block 520 of FIG. 5B, where computing device 200 may determine the coverage decision from block 424 of FIG. 4B for each set of values, a and d, where d=D-1. In block 522, computing device 200 may then determine the expected profit of the provider using a set of dynamic equations that are based on the service plan decision when the customer has a service plan during time period n and is in the last period of the service plan (i.e., when d=D-1). For example, when the service plan decision from block 424 indicates that the customer continues with the service plan and therefore allows the service plan to lapse, computing device 200 may determine $WII_n(a, 1, d)$ using Equation 16. Alternatively, when the service plan decision from block 424 indicates that the customer cancels the service plan and continues uncovered, computing device 200 may determine $WII_n(a, 1, d)$ using Equation 17. Finally, when the service plan decision from block 424 indicates that the customer cancels the service plan and buys a single period of service, computing device 200 may determine $WII_n(a, 1, d)$ using Equation 18.

Method 500 may then proceed to block 524, where computing device 200 may determine the product replacement decision from block 428 of FIG. 4B for each set of values a, d. In block 526, computing device 200 may then determine the expected profit of the provider using a set of dynamic equations that are based on the product replacement decision when the customer has a service plan during time period n. For example, when the product replacement decision from block 428 indicates that the customer replaces the product, computing device 200 may determine $VII_n(a, 1, d)$ using Equation 6. Alternatively, when the product replacement decision from block 428 indicates that the customer continues using the current product, computing device 200 may determine $VII_n(a, 1, d)$ using Equation 7.

Method 500 may then proceed to block 528, where computing device 200 may determine the product replacement decision from block 432 of FIG. 4B for each age value a. In block 530, computing device 200 may then determine the expected profit of the provider using a set of dynamic equations that are based on the product replacement decision when the customer does not have a service plan during time period n. For example, when the product replacement decision from block 432 indicates that the customer replaces the product, computing device 200 may determine $VII_n(a, 1, d)$ using Equation 8. Alternatively, when the product replacement decision from block 432 indicates that the customer continues using the current product, computing device 200 may determine $VII_n(a, 1, d)$ using Equation 9.

Method 500 may then proceed to block 532, where computing device 200 may determine whether n is less than N, where N is the total number of periods in the horizon. If so, method 500 may return to block 510 for determination of the expected net profit for the previous period in time based on each product replacement decision and each coverage decision. Otherwise, when n is currently equal to N, computing device 200 may determine that it has processed all time periods in the horizon. Accordingly, method 500 may proceed to block 534.

In block 534, computing device 200 may determine the expected profit of the provider as $WII_N(a, Y, d)$ for a selected set of state values. For example, assuming that the customer has a new product and does not yet have a service plan at the beginning of the time horizon, computing device 200 may output $WII_N(0, 0, 0)$ to an available display device. In addition, in some embodiments, computing device 200 may then implement the particular contract based, for example, on execution of contract implementing instructions 255 of FIG. 2. Method 500 may then proceed to block 536, where method 500 may stop.

According to the foregoing, example embodiments disclosed herein allow for a determination of the net utility attributable to a customer based on a series of product replacement and service plan coverage decisions made over time. In this manner, a customer may select a product and service plan for the product that maximize the value of the product and plan to him or her. In addition, a service provider may determine an expected profit for a number of contract pricing schemes and thereby evaluate various pricing schemes.

We claim:

1. A computing device comprising:
a processor to:
receive a request to determine an expected net utility attributable to a customer based on a service plan coverage decision and a product replacement decision of the customer for a plurality of corresponding time periods,
recursively determine expected net utility values for each possible coverage decision and each possible product replacement decision in each period of the plurality of time periods, wherein the expected net utility value for each coverage decision is based on an immediate utility value in a current time period and the expected net utility value of the product replacement decision from a next time period, and
determine the expected net utility attributable to the customer over the plurality of time periods using a set of initial values and the determined utility values for each time period.

2. The computing device of claim 1, wherein the expected net utility value is computed in each period of the plurality of time periods using a first set of dynamic equations corresponding to the product replacement decision and a second set of dynamic equations corresponding to the coverage decision.

3. The computing device of claim 2, wherein the processor is further configured to, prior to recursively determining the net utility values:
determine a first plurality of boundary values for the second set of dynamic equations, the first plurality of boundary values corresponding to the coverage decision for each of a plurality of possible state values during a last time period of the plurality of time periods, and determine a second plurality of boundary values for the first set of dynamic equations, the second plurality of boundary values corresponding to the product replacement decision for each of a plurality of possible state values during the last time period.

4. The computing device of claim 2, wherein the first set of dynamic equations comprises:
a first dynamic equation representing the product replacement decision of the customer when the customer has a service plan during the corresponding time period, and
a second dynamic equation representing the product replacement decision of the customer when the customer does not have a service plan during the corresponding time period.

5. The computing device of claim 2, wherein the second set of dynamic equations comprises:
a third dynamic equation representing the coverage decision of the customer when the customer does not have a service plan during the corresponding time period,
a fourth dynamic equation representing the coverage decision of the customer when the customer has a service plan and has more than one time period of coverage remaining for the service plan, and
a fifth dynamic equation representing the coverage decision of the customer when the customer has a service plan and is in a last time period of coverage for the service plan.

6. The computing device of claim 2, wherein the processor is further configured to:
determine each coverage decision based on each determined expected net utility value, each coverage decision corresponding to a maximum value in a particular equation in the second set of dynamic equations for a particular set of state values for a particular time period; and
determine each product replacement decision for each determined expected net utility value, each product replacement decision corresponding to a maximum value in a particular equation in the first set of dynamic equations for a particular set of state values for a particular time period,
wherein the set of state values describes an age of a currently-owned product, a value indicating whether the customer currently has a service plan, and a number of time periods that have elapsed in the service plan.

7. The computing device of claim 6, wherein the processor is further configured to:
determine an expected profit earned by a provider over the plurality of time periods based on each service plan decision and each product replacement decision of the customer for each of the plurality of time periods, wherein the expected profit is determined based on:
a third set of dynamic equations representing the expected profit earned by the provider based on each coverage decision of the customer for each time period; and
a fourth set of dynamic equations representing the expected profit earned by the provider based on each product replacement decision of the customer for each time period.

8. The computing device of claim 7, wherein the processor is further configured to:

determine the expected profit earned by the provider for each of a plurality of service contracts, each service contract including a service plan price, a regular product price, and a discounted product price, and
identify the service contract that maximizes profit earned by the provider.

9. A non-transitory machine-readable storage medium encoded with instructions executable by a processor of a computing device, the machine-readable storage medium comprising:
instructions for receiving a request to determine an expected net utility value attributable to a customer based on a product replacement decision and a service plan coverage decision of the customer for each of a plurality of corresponding time periods;
instructions for determining a plurality of utility values corresponding to each possible product replacement decision and each possible coverage decision in each of the plurality of corresponding time periods; and
instructions for determining the expected net utility value attributable to the customer over the plurality of time periods based on a set of initial values and the plurality of determined utility values.

10. The non-transitory machine-readable storage medium of claim 9, wherein:
each product replacement decision indicates whether the customer should replace a currently-owned product with a new product in the corresponding time period, and
each coverage decision indicates whether the customer should purchase a service plan or a single period of service for the currently-owned product during the corresponding time period.

11. The non-transitory machine-readable storage medium of claim 9, wherein the instructions for determining the plurality of utility values comprise:
instructions for determining a first plurality of boundary values for a set of dynamic equations representing the utility value corresponding to the coverage decision;
instructions for determining a second plurality of boundary values for a set of dynamic equations representing the utility value corresponding to the product replacement decision; and
instructions for recursively determining utility values corresponding to each possible product replacement decision and each possible coverage decision in each remaining period of the plurality of time periods.

12. The non-transitory machine-readable storage medium of claim 11, wherein the set of dynamic equations representing the utility value corresponding to the coverage decision comprises:

$W_n(a, 0, 0) = \max \{u_a^P - q_D + \alpha V_{n-1}(a+1, 1, 1), u_a^P - q_0 + \alpha V_{n-1}(a+1, 0, 0), u_a^0 + \alpha V_{n-1}(a+1, 0, 0)\}$, when the customer does not have a service plan during time period n;

$W_n(a, 1, d) = \max \{u_a^P + \alpha V_{n-1}(a+1, 1, d+1), u_a^0 + r_d + \alpha V_{n-1}(a+1, 0, 0), u_a^P + r_d - q_0 + \alpha V_{n-1}(a+1, 0, 0)\}$, when the customer has a service plan during time period n and $0 < d < D-1$; and $W_n(a, 1, d) = \max \{u_a^P + \alpha V_{n-1}(a+1, 0, 0), u_a^0 + r_d + \alpha V_{n-1}(a+1, 0, 0), u_a^P + r_d - q_0 + \alpha V_{n-1}(a+1, 0, 0)\}$, when the customer has a service plan during the time period, n, and $d = D-1$, where:

n is a number of time periods remaining, $u_a^P$ is a utility for a currently-owned product in a period in which the product is of age a and the customer has purchased the service plan, $u_a^0$ is a utility for the currently-owned product in a period in which the product is of age a and the customer has not purchased the service plan, $q_D$ is a cost of a D-period service plan commitment, $q_0$ is a cost of a one period service plan, $r_d$ is a refund when canceling the service plan with d periods of coverage elapsed, α is a discount factor, and $V_{n-1}(a, Y, d)$ is the total expected discounted utility with n−1 periods to go in state (a,Y,d) before any decisions are made in that period, where a represents the product age, Y indicates whether the product is covered by a service plan, and d indicates the number of periods elapsed in the service plan.

13. The non-transitory machine-readable storage medium of claim 12, wherein the set of dynamic equations representing the utility value corresponding to the product replacement decision comprises:

$V_n(a, 1, d) = \max \{W_n(0, 1, d) - p_F I(d<T) - p_0 I(d \geq T), W_n(a, 1, d)\}$, when the customer has a service plan during time period n; and $V_n(a, 0, 0) = \max \{W_n(0, 0, 0) - p_F, W_n(a, 0, 0)\}$, when the customer does not have a service plan during time period n, where:

$p_F$ is a full price of a new product when fewer than T periods have elapsed in the service plan, and $p_0$ is a discounted price of the new product when at least T periods have elapsed in the service plan.

14. The non-transitory machine-readable storage medium of claim 11, further comprising:

instructions for determining each coverage decision based on each corresponding utility value, each coverage decision corresponding to a maximum value in a particular equation in the corresponding set of dynamic equations for a particular set of state values in a particular time period; and instructions for determining each product replacement decision based on each corresponding utility value, each product replacement decision corresponding to a maximum value in a particular equation in the corresponding set of dynamic equations for a particular set of state values in a particular time period, wherein the set of state values describes an age of a currently-owned product, a value indicating whether the customer currently has a service plan, and a number of time periods that have elapsed in the service plan.

15. The non-transitory machine-readable storage medium of claim 14, further comprising:

instructions for determining an expected profit by a provider of service plans and products over the plurality of time periods based on the service plan decision and the product replacement decision of the customer for each of the time periods.

16. A method of determining an expected net utility value attributable to a customer based on a service plan decision and a product replacement decision of the customer for each of N time periods, the method comprising:

determining, by a computing device, a value of a first equation corresponding to the service plan decision for all state values a, Y, and d when n=0, wherein the first equation defines a utility to a customer in a particular time period, n, subsequent to the product replacement decision based on:

an age of the product, a, a variable, Y, indicating whether the customer has a service plan during the time period, a number of time periods elapsed in the service plan, d, and a number of remaining time periods, n;

determining a value of a second equation corresponding to the product replacement decision for all state values a, Y, and d when n=0, wherein the second equation defines a utility to the customer in a particular time period, n, prior to the product replacement decision;

recursively determining the value of the first equation and the second equation for all values a, Y, and D, for n=1 to N; and determining the expected net utility attributable to the customer as the value of the first equation for a selected set of state values when n=N.

17. The method of claim 16, wherein the service plan decision for each time period is defined based on the dynamic equations:

$W_n(a, 0, 0) = \max \{u_a^P - q_D + \alpha V_{n-1}(a+1, 1, 1), u_a^P - q_0 + \alpha V_{n-1}(a+1, 0, 0), u_a^0 + \alpha V_{n-1}(a+1, 0, 0)\}$, when the customer does not have a service plan during time period n;

$W_n(a, 1, d) = \max \{u_a^P + \alpha V_{n-1}(a+1, 1, d+1), u_a^0 + r_d + \alpha V_{n-1}(a+1, 0, 0), u_a^P + r_d - q_0 + \alpha V_{n-1}(a+1, 0, 0)\}$, when the customer has a service plan during time period n and $0<d<D-1$; and $W_n(a, 1, d) = \max \{u_a^P + \alpha V_{n-1}(a+1, 0, 0), u_a^0 + r_d + \alpha V_{n-1}(a+1, 0, 0), u_a^P + r_d - q_0 + \alpha V_{n-1}(a+1, 0, 0)\}$, when the customer has a service plan during time period n and d=D−1, where:

$u_a^P$ is a utility for a currently-owned product in the time period when the product is of age a and the customer has purchased the service plan, $u_a^0$ is a utility for the currently-owned product in the time period when the product is of age, a and the customer has not purchased the service plan, $q_D$ is a cost of a D-period service plan commitment, $q_0$ is a cost of a one period service plan, $r_d$ is a refund when canceling the service plan with d periods elapsed, α is a discount factor, and $V_{n-1}(a, Y, d)$ is the second equation corresponding to the product replacement decision for the time period n−1.

18. The method of claim 17, wherein the product replacement decision for each time period is defined based on the dynamic equations:

$V_n(a, 1, d) = \max \{W_n(0, 1, d) - p_F I(d<T) - p_0 I(d \geq T), W_n(a, 1, d)\}$, when the customer has a service plan during time period n; and $V_n(a, 0, 0) = \max \{W_n(0, 0, 0) - p_F, W_n(a, 0, 0)\}$, when the customer does not have a service plan during time period n, where:

$p_F$ is a price of a new product when fewer than T periods have elapsed in the service plan, and $p_0$ represents the price of the new product when at least T periods have elapsed in the service plan.

19. The method of claim 18, further comprising:

determining an expected profit by a provider of service plans and products over the N time periods based on the service plan decision and the product replacement decision of the customer for each of the N time periods, wherein the expected profit by the provider is $W\Pi_N(0, 0, 0)$ and $W\Pi_N(a, Y, d)$ is defined based on a first plurality of dynamic equations corresponding to the service plan decision, the first plurality of dynamic equations including:

a first set of dynamic equations based on the service plan decision when the customer does not have a service plan during time period n, a second set of dynamic equations based on the service plan decision when the customer has a service plan during time period n and d<D−1, and a third set of dynamic equations based on the service plan decision when the customer has a service plan during time period n and d=D−1.

20. The method of claim 19, wherein the first set, the second set, and the third set of dynamic equations are dependent on a second plurality of dynamic equations corresponding to the product replacement decision for a next time period, the second plurality of dynamic equations including:

a fourth set of dynamic equations based on the product replacement decision when the customer has a service plan during time period n; and a fifth set of dynamic equations based on the product replacement decision when the customer has a service plan during time period n.

\* \* \* \* \*